US012599847B2

(12) United States Patent
Pandelidis et al.

(10) Patent No.: US 12,599,847 B2
(45) Date of Patent: Apr. 14, 2026

(54) LIQUID SEPARATION SYSTEM

(71) Applicant: Baryon Inc., Wilmington, DE (US)

(72) Inventors: Demis Lukasz Pandelidis, Wroclaw (PL); Jeffrey Premer, Wilmington, DE (US)

(73) Assignee: Baryon Inc., Wilmington, DE (US)

( * ) Notice: Subject to any disclaimer, the term of this patent is extended or adjusted under 35 U.S.C. 154(b) by 232 days.

(21) Appl. No.: 18/449,158

(22) Filed: Aug. 14, 2023

(65) Prior Publication Data

US 2025/0058247 A1      Feb. 20, 2025

(51) Int. Cl.
| | |
|---|---|
| *B01D 1/22* | (2006.01) |
| *A23L 2/10* | (2006.01) |
| *B01D 5/00* | (2006.01) |
| *C02F 1/08* | (2023.01) |
| *C02F 1/10* | (2023.01) |
| *C02F 103/00* | (2006.01) |
| *C02F 103/08* | (2006.01) |

(52) U.S. Cl.
CPC ................ *B01D 1/221* (2013.01); *A23L 2/10* (2013.01); *B01D 5/0015* (2013.01); *B01D 5/0039* (2013.01); *B01D 5/006* (2013.01); *C02F 1/08* (2013.01); *C02F 1/10* (2013.01); *B01D 1/22* (2013.01); *C02F 2103/001* (2013.01); *C02F 2103/08* (2013.01); *C02F 2201/009* (2013.01); *C02F 2303/10* (2013.01)

(58) Field of Classification Search
CPC .... B01D 1/221; B01D 5/0015; B01D 5/0039; B01D 5/006; C02F 1/08; C02F 1/10; A23L 2/10
See application file for complete search history.

(56) References Cited

U.S. PATENT DOCUMENTS

| | | | | |
|---|---|---|---|---|
| 6,497,107 | B2 * | 12/2002 | Maisotsenko | ............ F28D 5/02 |
| | | | | 62/305 |
| 6,911,121 | B1 * | 6/2005 | Beckman | ............... B01D 3/346 |
| | | | | 261/153 |
| 8,613,839 | B2 * | 12/2013 | Maisotsenko | ............ B01D 1/22 |
| | | | | 202/185.1 |
| 8,858,758 | B2 * | 10/2014 | Zebuhr | .................... C02F 1/08 |
| | | | | 159/6.3 |
| 10,196,285 | B2 * | 2/2019 | Shahsavar | ............ B01D 5/0003 |
| 10,702,830 | B2 * | 7/2020 | Ong | ........................ C02F 1/447 |
| 11,413,581 | B2 * | 8/2022 | Falath | ..................... C02F 1/447 |

(Continued)

OTHER PUBLICATIONS

International Search Report and Written Opinion dated Jan. 24, 2024 for PCT/US2023/072142.

*Primary Examiner* — Jonathan Miller
(74) *Attorney, Agent, or Firm* — King & Spalding LLP

(57) ABSTRACT

A separation system separates a first liquid from a compound liquid. Examples of the compound liquid are seawater, brine, rainwater, wastewater, biofuel precursors, lactic acid, or fruit juice. A plate heat exchanger includes at least one evaporation channel and at least one condensation channel. The compound liquid flows through the evaporation channel where the first liquid evaporates from the compound liquid into a gas. A direct heat exchanger further evaporates the first liquid into the gas. The gas flows from the direct heat exchanger through the condensation channel where the first liquid condenses and is thereby separated from the compound liquid.

20 Claims, 3 Drawing Sheets

(56) References Cited

U.S. PATENT DOCUMENTS

| | | | |
|---|---|---|---|
| 2002/0038552 A1* | 4/2002 | Maisotsenko | F28D 5/02 |
| | | | 62/310 |
| 2003/0033821 A1* | 2/2003 | Maisotsenko | F24F 3/1411 |
| | | | 62/310 |
| 2005/0016197 A1* | 1/2005 | Bourne | F28C 3/08 |
| | | | 62/304 |
| 2005/0224333 A1* | 10/2005 | Saifutdinov | B01D 1/065 |
| | | | 202/160 |
| 2006/0272933 A1* | 12/2006 | Domen | B01D 1/221 |
| | | | 203/10 |
| 2006/0288709 A1* | 12/2006 | Reidy | B01D 5/0042 |
| | | | 62/3.4 |
| 2007/0101746 A1* | 5/2007 | Schlom | F24F 1/0059 |
| | | | 62/332 |
| 2007/0193870 A1* | 8/2007 | Prueitt | B01D 1/26 |
| | | | 159/32 |
| 2011/0108406 A1* | 5/2011 | Maisotsenko | B01D 3/346 |
| | | | 202/180 |
| 2016/0251235 A1* | 9/2016 | Shahsavar | B01D 5/006 |
| | | | 203/25 |
| 2019/0352194 A1* | 11/2019 | Thiers | C02F 1/28 |
| 2020/0171405 A1 | 6/2020 | Reeder et al. | |

* cited by examiner

LIQUID SEPARATION SYSTEM

STATEMENT REGARDING FEDERAL GOVERNMENT RIGHTS

This invention was made with support from the U.S. government under contract number DE-EE0009683 awarded by the United States Department of Energy. The U.S. government has certain rights in this invention.

TECHNICAL FIELD

Embodiments of the technology relate generally to a liquid separation device that includes a direct heat exchanger and a plate heat exchanger.

BACKGROUND

The growing world population and increased water demand for agricultural, industrial, and domestic purposes causes increased water scarcity and stress on the world's water systems. One approach to addressing the demand for water is desalination of salt water. However, desalination can be an energy intensive and expensive process. Accordingly, improved systems that can desalinate salt water by separating water from the other components in the salt water would be beneficial. In other words, improved liquid separation systems that can operate more cost effectively and with greater energy efficiency would be beneficial.

In addition to desalinating salt water, improved liquid separation systems can have a variety of other applications. As examples, liquid separation systems can be used in processing rainwater, wastewater, biofuels, lactic acid, and potable liquids such as fruit juices. Accordingly, more efficient and cost-effective liquid separation systems can have a variety of benefits.

SUMMARY

The present disclosure relates to a separation system. The separation system can comprise: (i) a plurality of plates within which is disposed at least one evaporation channel; (ii) a tank arranged to contain a compound liquid and that can supply the compound liquid to flow along an inner wall of the at least one evaporation channel, wherein the compound liquid can comprise a first liquid having a first evaporation potential and a second component having a second evaporation potential; (iii) a gas moving device that can be arranged to move a gas through the at least one evaporation channel, wherein a portion of the first liquid flowing along the inner wall of the at least one evaporation channel evaporates into the gas as the gas moves through the evaporation channel; (iv) a direct heat exchanger that can be in thermal communication with the tank, the direct heat exchanger arranged to transfer heat to the compound liquid causing an additional portion of the first liquid in the tank to evaporate into the gas as the gas exits the evaporation channel and enters the direct heat exchanger; (v) at least one condensation channel disposed within the plurality of plates, the at least one condensation channel in thermal communication with the at least one evaporation channel, the at least one condensation channel can be arranged to receive the gas as it exits the direct heat exchanger and to cause the first liquid to condense from the gas as the gas moves through the at least one condensation channel; and (vi) a condensation receptacle that can receive the first liquid after it condenses within the at least one condensation channel.

Another example embodiment provides a method for separating a compound liquid. The method can comprise: (i) providing the compound fluid from a tank to at least one evaporation channel, the at least one evaporation channel disposed in a plate heat exchanger, wherein the compound fluid flows along an inner wall of the at least one evaporation channel, and wherein the compound fluid comprises a first liquid having a first evaporation potential and a second component having a second evaporation potential; (ii) providing a gas that flows through the at least one evaporation channel, wherein a portion of the first liquid flowing along the inner wall of the at least one evaporation channel evaporates into the gas as the gas flows through the at least one evaporation channel; (iii) providing the gas as it exits the at least one evaporation channel to a direct heat exchanger, wherein the direct heat exchanger provides heat to the compound fluid in the tank causing an additional portion of the first liquid in the tank to evaporate into the gas as the gas flows through the direct heat exchanger; (iv) providing the gas as it exits the direct heat exchanger to at least one condensation channel of the plate heat exchanger, the at least one condensation channel in thermal communication with the at least one evaporation channel, wherein the first liquid condenses from the gas as the gas flows through the at least one condensation channel; and (v) providing the first liquid that condenses in the at least one condensation channel to a condensation receptacle.

The foregoing embodiments are non-limiting examples and other aspects and embodiments will be described herein. The foregoing summary is provided to introduce various concepts in a simplified form that are further described below in the detailed description. This summary is not intended to identify required or essential features of the claimed subject matter nor is the summary intended to limit the scope of the claimed subject matter.

BRIEF DESCRIPTION OF THE DRAWINGS

The accompanying drawings illustrate only example embodiments of apparatus and methods for liquid separation systems and therefore are not to be considered limiting of the scope of this disclosure. The principles illustrated in the example embodiments of the drawings can be applied to alternate methods and apparatus. Additionally, the elements and features shown in the drawings are not necessarily to scale, emphasis instead being placed upon clearly illustrating the principles of the example embodiments. Certain dimensions or positions may be exaggerated to help visually convey such principles. In the drawings, the same reference numerals used in different embodiments designate like or corresponding, but not necessarily identical, elements.

DETAILED DESCRIPTION OF EXAMPLE EMBODIMENTS

The example embodiments discussed herein are directed to apparatus and methods for separating a first liquid from a compound liquid. The example embodiments described herein provide improved approaches to separating liquids. As will be described further below, the example separation systems and methods can operate with greater energy efficiency than existing approaches to separating liquids. Furthermore, the example separation systems and methods are simpler than existing approaches allowing them to be more compact and expanding their use in a variety of applications. The separation systems and methods described herein can be used to separate a first liquid from a compound liquid by taking advantage of the greater evaporation potential of the first liquid. Examples of compound liquids with which the examples can be applied include: seawater, brine, rainwater, wastewater, biofuel precursors, lactic acid, and fruit juice. The advantages of the separation systems described herein will be illustrated in greater detail in connection with the example embodiments described below.

In the following paragraphs, particular embodiments will be described in further detail by way of example with reference to the drawings. In the description, well-known components, methods, and/or processing techniques are omitted or briefly described. Furthermore, reference to various feature(s) of the embodiments is not to suggest that all embodiments must include the referenced feature(s).

Figure 1:
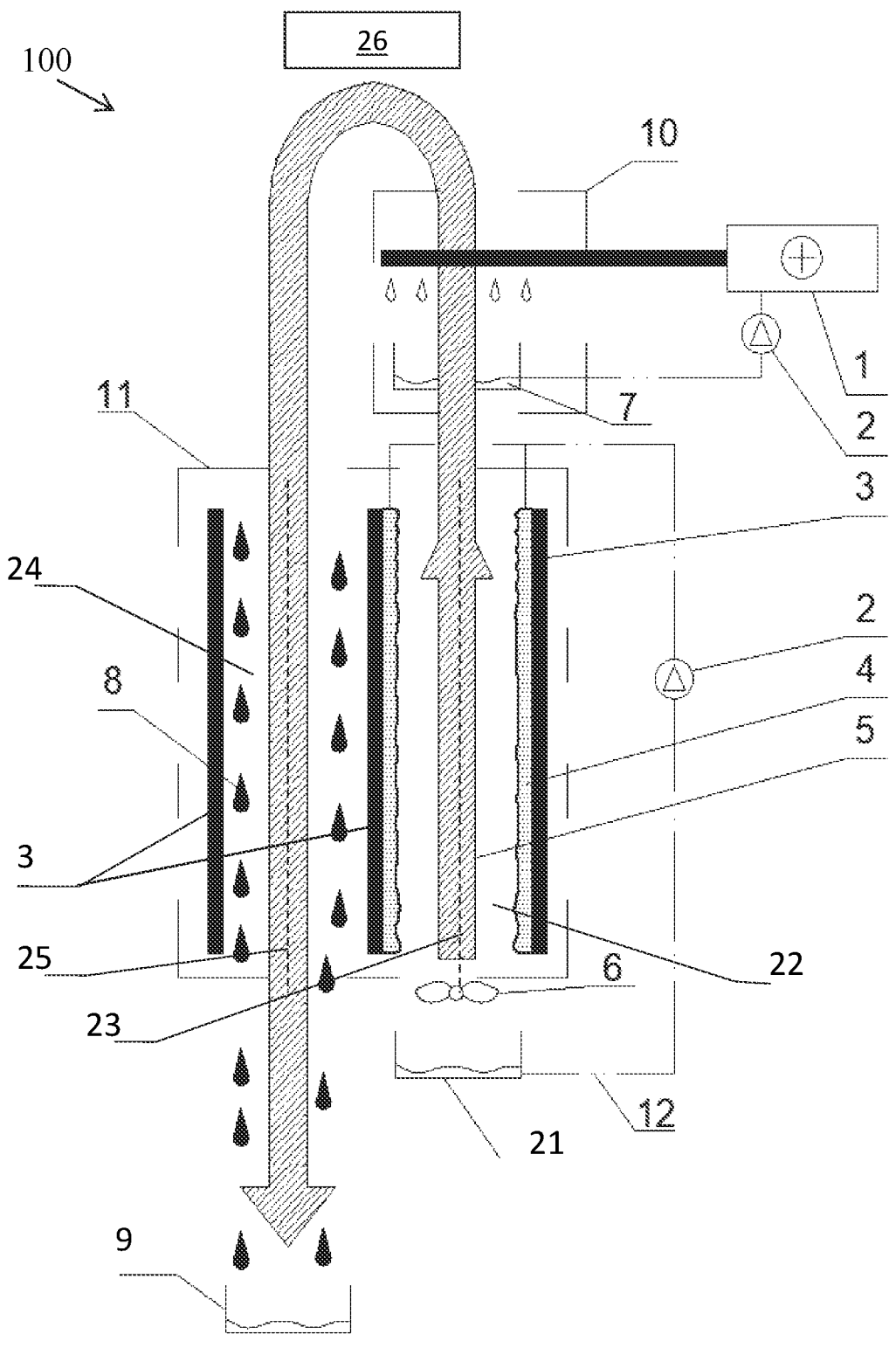
FIG. 1 illustrates a liquid separation system in accordance with a first example embodiment of the disclosure.
Figure 2:
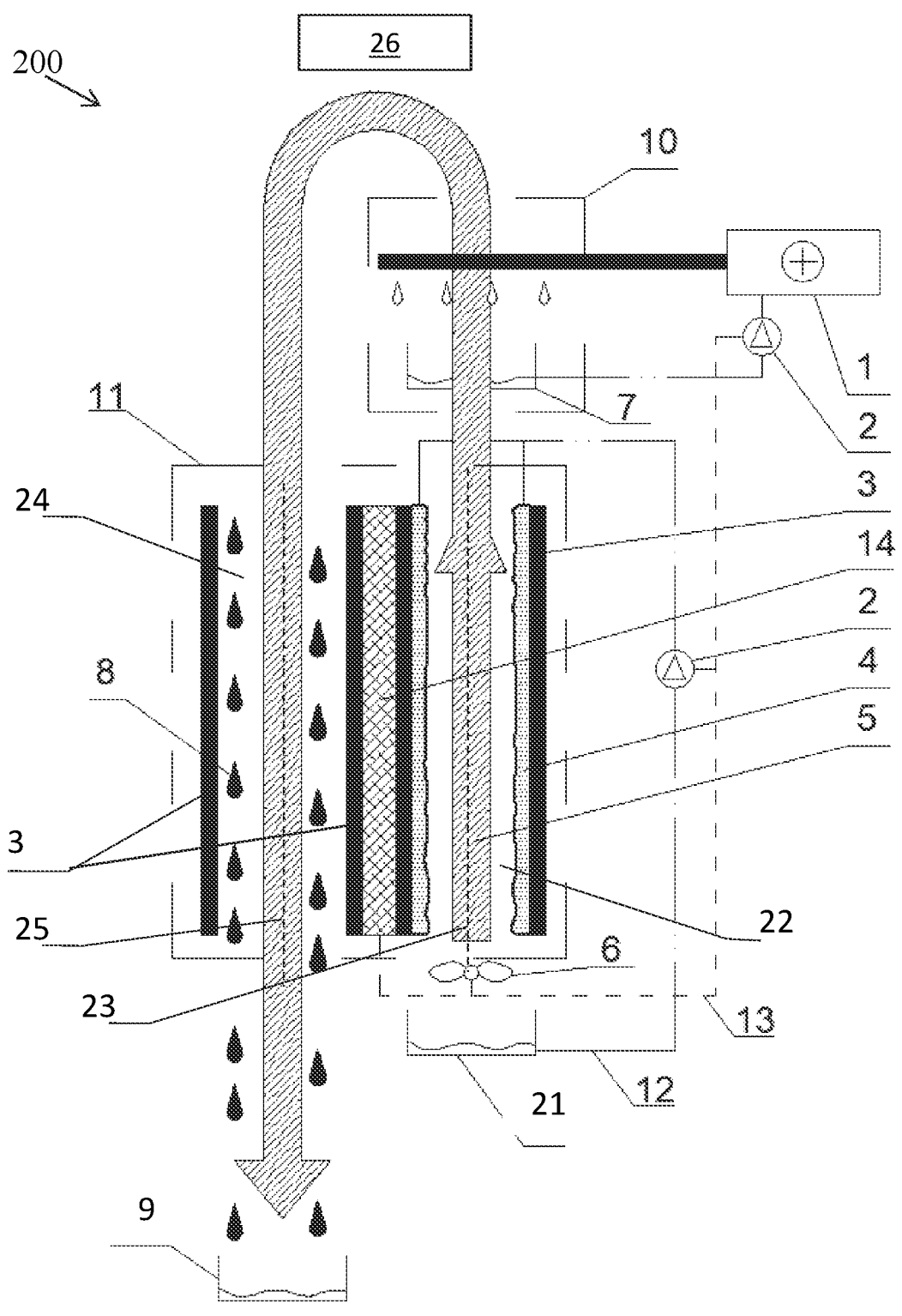
FIG. 2 illustrates a liquid separation system in accordance with a second example embodiment of the disclosure.
Figure 3:
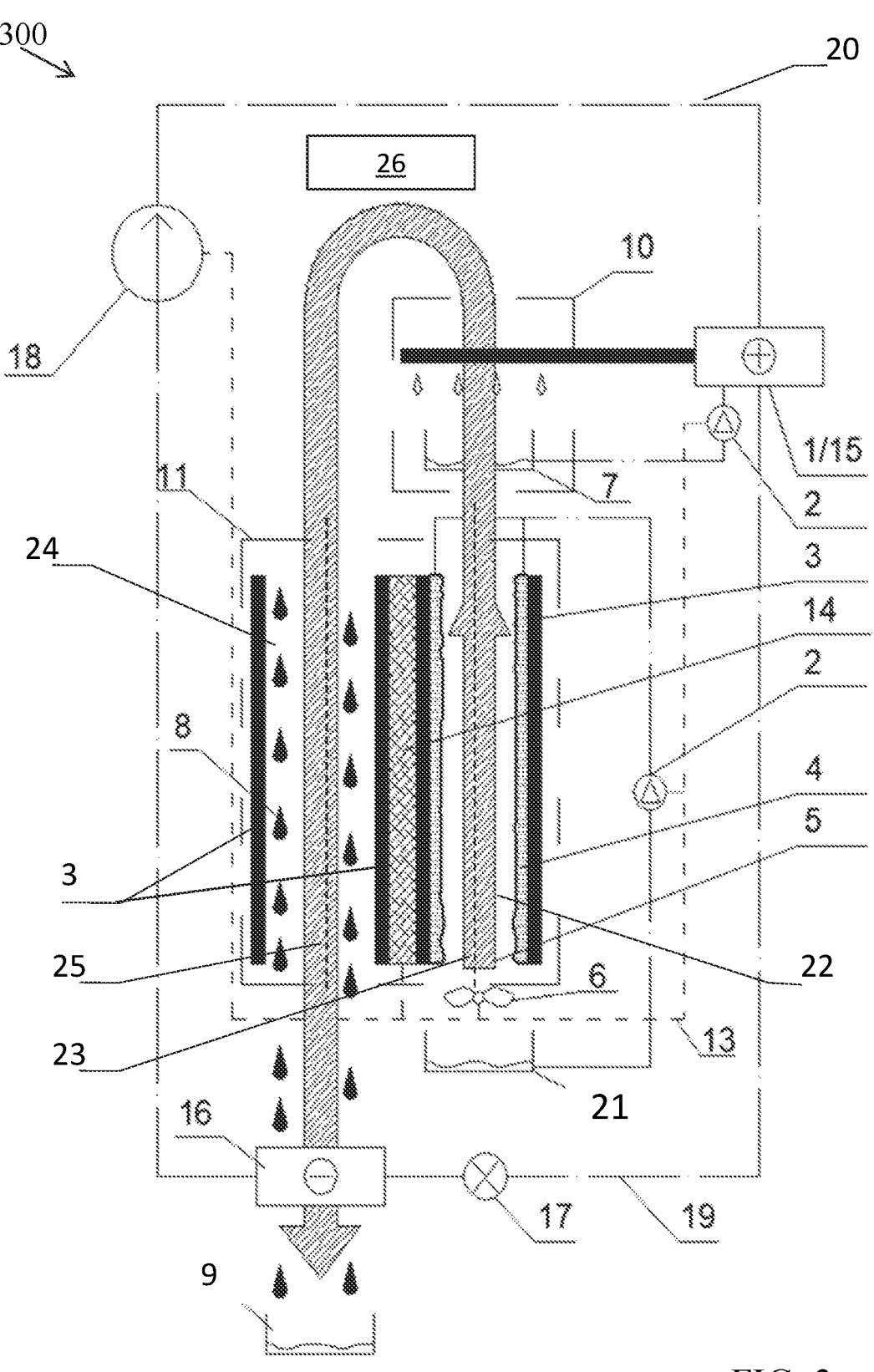
FIG. 3 illustrates a liquid separation system in accordance with a third example embodiment of the disclosure.

Referring now to the figures, an example separation system 100 is illustrated in cross-section in FIG. 1. FIG. 2 and FIG. 3 illustrate additional example embodiments of separation systems also shown in cross-section. The following is a list of components of the example separation systems which will be described in further detail below.

1—Heat source
2—Pump
3—Plate
4—Compound liquid comprising a first liquid and a second component
5—Gas which passes through the system
6—Fan
7—Compound liquid tank
8—Condensate of first liquid
9—Condensation receptacle
10—Direct heat exchanger
11—Plate heat exchanger
12—Compound liquid circuit
13—Electric circuit
14—Thermoelectric generator
15—Condenser of heat pump
16—Evaporator of heat pump
17—Expansion valve
18—Compressor
19—Refrigerant circuit
20—Heat pump
21—Evaporation channel receptacle
22—Evaporation channel
23—Central longitudinal axis of evaporation channel
24—Condensation channel
25—Central longitudinal axis of condensation channel
26—Redirection means Referring now to the example of FIG. 1, separation system 100 can be used to separate a first liquid from a compound liquid. The compound liquid 7 can comprise components with different evaporation potentials, including a first liquid with a greater evaporation potential than other components present in the compound liquid. The system 100 comprises a plate heat exchanger 11 and a direct heat exchanger 10. The direct heat exchanger 10 comprises a heat source 1 that delivers heat to the compound liquid present in a tank 7. As examples, the heat source can comprise a resistor heating element or a compressor of a heat pump.

The plate heat exchanger comprises at least one evaporation channel 22 and at least one condensation channel 24 that are formed by plates 3 of the plate heat exchanger 11.

Other embodiments of the plate heat exchanger can comprise multiple evaporation channels and multiple condensation channels. To optimize the transfer of heat between the channels of the plate heat exchanger, the plates are made of a thermally conductive material, such as any of various metallic materials, alloys, or composites. The plates illustrated in the example of system 100 have a parallel orientation wherein the evaporation channel 22 has a central longitudinal axis 23 that is parallel to a central longitudinal axis 25 of the condensation channel 24. Although not illustrated in FIG. 1, the channels formed by the plates can be largely enclosed along their edges by gaskets or other features that limit the inlet and outlet points for liquids flowing through the channels. In other embodiments of a separation system the plates and the channels can have orientations that are not parallel.

The separation system 100 relies upon a three stage process. The first stage can be an initial saturation of a gas 5 flowing through the at least one evaporation channel 22. The gas 5 can be air or another gas suitable for the separation process. As illustrated in FIG. 1, compound fluid 4 can flow along the interior walls of the evaporation channel 22. As one example, the compound fluid 4 can flow from tank 7 into a fluid circuit 12 wherein the compound fluid is directed to the interior walls of the evaporation channel 22. The compound fluid 4 may be directed through the fluid circuit by a pump 2, by gravity, or by another source of pressure (e.g., geothermal brine under its natural pressure or a seawater current).

A fan 6 can be used to move the gas 5 from an inlet end of the evaporation channel 22, through the evaporation channel 22, and out an outlet end of the evaporation channel 22. As the gas 5 moves through the evaporation channel 22, it contacts the compound liquid 4 flowing along the interior walls of the evaporation channel 22 and causes a first fluid of the compound fluid 4 to evaporate into the gas 5. The first fluid can have a greater evaporation potential than other components of the compound fluid 4. The evaporation of the first fluid into the gas 5 separates the first fluid from the compound fluid 4. The evaporation in the evaporation channel also causes cooling of the plates of the plate heat exchanger 11.

The second stage can provide increased saturation of the gas 5 in the direct heat exchanger 10. After the gas leaves the outlet end of the evaporation channel 22, it passes through direct heat exchanger 10 containing the heat source 1. The heat source 1 can heat the compound fluid 4 present in the tank 7 causing further evaporation of the first fluid from the compound fluid 4 and further saturation of the gas 5 with the first fluid. The heat source 1 also can heat the gas 5 passing through the direct heat exchanger 10 further increasing the capacity of the gas 5 for saturation with the evaporated first fluid. The additional heat of the direct heat exchanger 10 intensifies evaporation and it allows oversaturate of the gas 5 with the first fluid, which facilitates condensation of the first fluid in the third stage.

The oversaturated gas 5 leaves the direct heat exchanger 10 through an outlet and returns to the plate heat exchanger 11 for the third stage. The direct heat exchanger 10 can be oriented so that it is positioned at the outlet of the evaporation channel 22 and at the inlet of the condensation channel 24. Optionally, a redirection means 26 can be located at the outlet of the direct heat exchanger 10 to redirect the flow of the oversaturated gas 5 to the condensation channel 24. Examples of the redirection means 26 include a fan, a baffle, or barrier. The oversaturated gas 5 enters the condensation channel 24 at an inlet and flows through the condensation channel toward an outlet of the condensation channel 24. The interior walls of the condensation channel are not wetted with the compound fluid as was the case with the evaporation channel. Instead, the walls of the condensation channel 24 have been cooled by the evaporation in the evaporation channel. The cooled walls of the condensation channel 24 cause the first liquid 8 to condense from the warm, oversaturated gas 5 as the gas flows through the condensation channel 24. The first liquid 8 formed by the condensation can be collected in a condensation receptacle 9 located at the outlet of the condensation channel 24. Subsequently, the first liquid 8 can be conveyed from the condensation receptacle 9 for storage or for a variety of applications now that the first liquid 8 has been separated from the compound liquid 4. An additional benefit of the system 100 is that the latent heat of the condensation in the condensation channel 24 is transferred to the evaporation channel 22 thereby increasing evaporation and improving the energy efficiency of the system 100. Due to the transfer of heat between the condensation channel and the evaporation channel, only a small amount of electrical energy is needed for components such as the heat source 1, the fan 6, and the pump 2. Thus, the separation system 100 can separate the first fluid from the compound fluid with very low energy consumption.

The following data shown in Table 1 is representative data for the operation of a separation system similar to that illustrated in FIG. 1. This representative data illustrates the ability of the separation system to produce pure distilled water from a waste fluid with a minimal power consumption.

TABLE 1

| | Minutes of time | | | | |
| --- | --- | --- | --- | --- | --- |
| | 0 | 180 | 360 | 480 | Total |
| Fluid A output—pure distilled water output in litres | 0 | 1180 | 1232 | 1211 | 3623 |
| Fluid B output—concentrated waste fluid output in litres | 0 | 505 | 528 | 519 | 1552 |
| Power consumption in Wh | 0 | 1770 | 1602 | 1695 | 5067 |

In contrast to the above data illustrating the efficiency of the example separation systems described herein, conventional systems typically consume nearly double the amount of energy. For example, existing ionic exchange membrane technology, commonly used in commercial desalination of seawater, according to industry quoted statistics, consumes 3-3.5 kWh per M3 of desalinated water.

The examples of fluids which can be used for separation with this method are: seawater, brines, lactic acid, biofuel precursors, fruit juices, wastewater, rainwater etc. Each application may include dedicated optimization of the structure of heat exchangers in order to achieve better performance. Seawater, brines, lactic acid and biofuel precursors require the use of material which are resistant to corrosion. Juice concentration requires materials approved for contact with potable fluids. Seawater and rainwater allow for the use of lower channel heights (e.g., 2-4 mm). In contrast, due to higher liquid viscosity and/or higher particulate matter content, certain liquids and slurries such as wastewater, juices, brines and acids require higher channels (>3 mm). The concentration of juice may require additional heating of the juice before entering the plate heat exchanger. For all of the applications it is recommended to use the same channel shape: flat rectangular, guideless structures of the plate heat exchangers (guideless channel structure is optimal for fluid separation, because it allows to easily remove concentrated fluid).

Referring now to FIG. 2, another example embodiment of a separation system 200 is illustrated. The foregoing description of the components and operation of the separation system 100 of FIG. 1 applies to similar elements having the same reference numbers in separation system 200 of FIG. 2. Accordingly, their description will not be repeated. Separation system 200 is substantially identical to separation system 100. Due to the fact that the fluid separation process using the separation system 200 can be thermally driven and it includes high amounts of heat transfer through the plates of the plate heat exchanger 11, while requiring low amounts of electrical energy to operate the components of the system, the addition of a thermoelectric generator 14 can provide additional benefits. As illustrated in FIG. 2, the thermoelectric generator 14 can be placed in thermal communication with the in the evaporation channel 22 and the condensation channel 24. In this case, the heat generated by condensation in the condenser channel 24 and transferred to the evaporation channel 22 can be partly converted to electricity in the thermoelectric generator 14. The heat flux passes through the exchanger plates 3 and consequently through the thermoelectric generator 14, where part of it can be converted to electrical energy. The obtained electrical energy can be transferred to the electrical circuit 13 to power components of the separation system, such as the pump 2 and the fan 6.

Referring now to FIG. 3, another example embodiment of a separation system 300 is illustrated. The foregoing descriptions of the components and operation of the separation system 100 of FIG. 1 and the separation system 200 of FIG. 2 applies to similar elements having the same reference numbers in separation system 300 of FIG. 3. Accordingly, their description will not be repeated. Separation system 300 is substantially identical to separation systems 100 and 200, except that it introduces a heat pump system 20. Due to the fact that the process needs heat and it can produce electrical energy through the thermoelectric effect, separation system 300 can benefit from implementation of the heat pump 20. The example heat pump 20 can comprise the following primary elements: a condenser 15, an evaporator 16, an expansion valve 17, a compressor 18, and a refrigerant circuit 19. The benefit of the heat pump can be that it can be characterized by Coefficient of Performance (COP) which means that it generates more heat than the electrical energy that it consumes. The implementation of the heat pump 20 in FIG. 3 can generate heat used for separation of the first liquid from the compound liquid, while consuming relatively low energy. The condenser 15 may be used as the heat source for the direct heat exchanger 10, wherein it can be used directly or indirectly (with additional intermediary medium). The evaporator 16 may be used after the third stage of the separation process to increase the condensation of the first fluid 8 from the gas 5 (which additionally increases the effectiveness of the process). The compressor 18 and other electrical elements of the separation system 300 are powered with electricity generated through heat transfer on the thermoelectric generator 14. The evaporator 16 and the condenser 15 can be additionally equipped with thermoelectric generators to add additional electricity generation capacity and to improve the overall energy efficiency of the separation system 300.

Example Embodiments [EE]

The following are illustrative example embodiments. Other example embodiments beyond those listed below also are within the scope of the disclosure.

[EE1] A separation system comprising:

a plurality of plates within which is disposed at least one evaporation channel;

a tank arranged to contain a compound liquid and supply the compound liquid to flow along an inner wall of the at least one evaporation channel, wherein the compound liquid comprises a first liquid having a first evaporation potential and a second component having a second evaporation potential;

a gas moving device arranged to move a gas through the at least one evaporation channel, wherein a portion of the first liquid flowing along the inner wall of the at least one evaporation channel evaporates into the gas as the gas moves through the evaporation channel;

a direct heat exchanger in thermal communication with the tank, the direct heat exchanger arranged to transfer heat to the compound liquid causing an additional portion of the first liquid in the tank to evaporate into the gas as the gas exits the evaporation channel and enters the direct heat exchanger;

at least one condensation channel disposed within the plurality of plates, the at least one condensation channel in thermal communication with the at least one evaporation channel, the at least one condensation channel arranged to receive the gas as it exits the direct heat exchanger and to cause the first liquid to condense from the gas as the gas moves through the at least one condensation channel; and a condensation receptacle that receives the first liquid after it condenses within the at least one condensation channel.

[EE2] The separation system of EE1, wherein the compound liquid is a mixture comprising one of: seawater, brine, rainwater, wastewater, and fruit juice.

[EE3] The separation system of EE1, wherein the gas is air.

[EE4] The separation system of EE1, wherein the tank is disposed at an outlet of the at least one evaporation channel and at an inlet of the at least one condensation channel.

[EE5] The separation system of EE1, wherein the direct heat exchanger also transfers heat to the gas as the gas flows through the direct heat exchanger.

[EE6] The separation system of EE1, further comprising an evaporation channel receptacle that collects a portion of the compound liquid that does not evaporate in and flows out of the at least one evaporation channel.

[EE7] The separation system of EE1, wherein the at least one evaporation channel has a longitudinal axis oriented parallel to a longitudinal axis of the at least one condensation channel.

[EE8] The separation system of EE7, further comprising a redirection means that redirects the gas exiting the direct heat exchanger into the at least one condensation channel.

[EE9] The separation system of EE1, further comprising a thermoelectric generator in thermal communication with the at least one evaporation channel and the at least one condensation channel.

[EE10] The separation system of EE9, further comprising an electric circuit that supplies power from the thermoelectric generator to the direct heat exchanger.

[EE11] The separation system of EE1, further comprising a heat pump, wherein the heat pump supplies heat to the direct heat exchanger.

[EE12] The separation system of EE11, wherein the heat pump cools the gas exiting the at least one condensation channel.

[EE13] The separation system of EE9, further comprising an electric circuit that supplies power to a heat pump.

[EE14] A method of separating a compound fluid, the method comprising:

providing the compound fluid from a tank to at least one evaporation channel, the at least one evaporation channel disposed in a plate heat exchanger, wherein the compound fluid flows along an inner wall of the at least one evaporation channel, and wherein the compound fluid comprises a first liquid having a first evaporation potential and a second component having a second evaporation potential;

providing a gas that flows through the at least one evaporation channel, wherein a portion of the first liquid flowing along the inner wall of the at least one evaporation channel evaporates into the gas as the gas flows through the at least one evaporation channel;

providing the gas as it exits the at least one evaporation channel to a direct heat exchanger, wherein the direct heat exchanger provides heat to the compound fluid in the tank causing an additional portion of the first liquid in the tank to evaporate into the gas as the gas flows through the direct heat exchanger;

providing the gas as it exits the direct heat exchanger to at least one condensation channel of the plate heat exchanger, the at least one condensation channel in thermal communication with the at least one evaporation channel, wherein the first liquid condenses from the gas as the gas flows through the at least one condensation channel; and providing the first liquid that condenses in the at least one condensation channel to a condensation receptacle.

[EE15] The method of EE14, wherein the tank is disposed at an outlet of the at least one evaporation channel and at an inlet of the at least one condensation channel.

[EE16] The method of EE14, wherein the direct heat exchanger also transfers heat to the gas as the gas flows through the direct heat exchanger.

[EE17] The method of EE14, further comprising redirecting the gas exiting the direct heat exchanger into the at least one condensation channel.

[EE18] The method of EE14, further comprising generating power from a thermoelectric generator in thermal communication with the at least one evaporation channel and the at least one condensation channel.

[EE19] The method of EE18, further comprising supplying the power to the direct heat exchanger.

[EE20] The method of EE18, further comprising supplying the power to a heat pump, the heat pump supplying heat to the direct heat exchanger, and the heat pump cooling the gas exiting the at least on condensation channel.

For any figure shown and described herein, one or more of the components may be omitted, added, repeated, and/or substituted. Additionally, it should be understood that in certain cases components of the example systems can be combined or can be separated into subcomponents. Accordingly, embodiments shown in a particular figure should not be considered limited to the specific arrangements of components shown in such figure. Further, if a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure.

With respect to the example methods described herein, it should be understood that in alternate embodiments, certain steps of the methods may be performed in a different order, may be performed in parallel, or may be omitted. Moreover, in alternate embodiments additional steps may be added to the example methods described herein. Accordingly, the example methods provided herein should be viewed as illustrative and not limiting of the disclosure.

Terms such as "first", "second", "top", "bottom", "side", "distal", "proximal", and "within" are used merely to distinguish one component (or part of a component or state of a component) from another. Such terms are not meant to denote a preference or a particular orientation, and are not meant to limit the embodiments described herein unless specifically indicated by the context. In the example embodiments described herein, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The terms "a," "an," and "the" are intended to include plural alternatives, e.g., at least one. The terms "including", "with", and "having", as used herein, are defined as comprising (i.e., open language), unless specified otherwise.

Although embodiments described herein are made with reference to example embodiments, it should be appreciated by those skilled in the art that various modifications are well within the scope of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A separation system comprising:
a plurality of plates within which is disposed at least one evaporation channel;
a tank arranged to contain a compound liquid and supply the compound liquid to flow along an inner wall of the at least one evaporation channel, wherein the compound liquid comprises a first liquid having a first evaporation potential and a second component having a second evaporation potential;
a gas moving device arranged to move a gas through the at least one evaporation channel, wherein a portion of the first liquid flowing along the inner wall of the at least one evaporation channel evaporates into the gas as the gas moves through the evaporation channel;
a direct heat exchanger in thermal communication with the tank, the direct heat exchanger arranged to transfer heat to the gas and arranged to transfer heat to the compound liquid causing an additional portion of the first liquid in the tank to evaporate into the gas as the gas exits the evaporation channel and enters the direct heat exchanger;
at least one condensation channel disposed within the plurality of plates, the at least one condensation channel in thermal communication with the at least one evaporation channel, the at least one condensation channel arranged to receive the gas as the gas exits the direct heat exchanger and to cause the first liquid to condense from the gas as the gas moves through the at least one condensation channel; and
a condensation receptacle that receives the first liquid after the first liquid condenses within the at least one condensation channel.

2. The separation system of claim 1, wherein the compound liquid is a mixture comprising one of: seawater, brine, rainwater, wastewater, and fruit juice.

3. The separation system of claim 1, wherein the gas is air.

4. The separation system of claim 1, wherein the tank is disposed at an outlet of the at least one evaporation channel and at an inlet of the at least one condensation channel.

5. The separation system of claim 1, wherein the direct heat exchanger transfers heat to the gas as the gas flows through the direct heat exchanger.

6. The separation system of claim 1, further comprising an evaporation channel receptacle that collects a portion of the compound liquid that does not evaporate in and flows out of the at least one evaporation channel.

7. The separation system of claim 1, wherein the at least one evaporation channel has a longitudinal axis oriented parallel to a longitudinal axis of the at least one condensation channel.

8. The separation system of claim 7, further comprising a redirection means that redirects the gas exiting the direct heat exchanger into the at least one condensation channel.

9. The separation system of claim 1, further comprising a thermoelectric generator in thermal communication with the at least one evaporation channel and the at least one condensation channel.

10. The separation system of claim 9, further comprising an electric circuit that supplies power from the thermoelectric generator to the direct heat exchanger.

11. The separation system of claim 1, further comprising a heat pump, wherein the heat pump comprises a refrigerant circuit, a compressor, a condenser, an expansion valve, and an evaporator, and wherein heat supplied to the direct heat exchanger is generated by the compressor compressing refrigerant in the refrigerant circuit.

12. The separation system of claim 11, wherein the evaporator cools the gas exiting the at least one condensation channel.

13. The separation system of claim 9, further comprising an electric circuit that supplies power to a heat pump.

14. A method of separating a compound fluid, the method comprising:
providing the compound fluid from a tank to at least one evaporation channel, the at least one evaporation channel disposed in a plate heat exchanger, wherein the compound fluid flows along an inner wall of the at least one evaporation channel, and wherein the compound fluid comprises a first liquid having a first evaporation potential and a second component having a second evaporation potential;
providing a gas that flows through the at least one evaporation channel, wherein a portion of the first liquid flowing along the inner wall of the at least one evaporation channel evaporates into the gas as the gas flows through the at least one evaporation channel;
providing the gas as the gas exits the at least one evaporation channel to a direct heat exchanger, wherein the direct heat exchanger provides heat to the gas and provides heat to the compound fluid in the tank causing an additional portion of the first liquid in the tank to evaporate into the gas as the gas flows through the direct heat exchanger;

providing the gas as the gas exits the direct heat exchanger to at least one condensation channel of the plate heat exchanger, the at least one condensation channel in thermal communication with the at least one evaporation channel, wherein the first liquid condenses from the gas as the gas flows through the at least one condensation channel; and providing the first liquid that condenses in the at least one condensation channel to a condensation receptacle.

15. The method of claim 14, wherein the tank is disposed at an outlet of the at least one evaporation channel and at an inlet of the at least one condensation channel.

16. The method of claim 14, wherein the direct heat exchanger transfers heat to the gas as the gas flows through the direct heat exchanger.

17. The method of claim 14, further comprising redirecting the gas exiting the direct heat exchanger into the at least one condensation channel.

18. The method of claim 14, further comprising generating power from a thermoelectric generator in thermal communication with the at least one evaporation channel and the at least one condensation channel.

19. The method of claim 18, further comprising supplying the power to the direct heat exchanger.

20. The method of claim 18, further comprising supplying the power to a heat pump, wherein the heat pump comprises a refrigerant circuit, a compressor, a condenser, an expansion valve, and an evaporator, wherein heat supplied to the direct heat exchanger is generated by the compressor compressing refrigerant in the refrigerant circuit, and wherein the evaporator cools the gas exiting the at least on condensation channel.

*    *    *    *    *